United States Patent [19]
Chase

[11] Patent Number: 5,695,293
[45] Date of Patent: Dec. 9, 1997

[54] HAND HELD BRUSH FOR DELIVERING MULTIPLE FOAMABLE WASH/WAX SOLUTIONS

[76] Inventor: Steven Andrew Chase, 2235 NW. 15th St., Oklahoma City, Okla. 73107

[21] Appl. No.: 529,649

[22] Filed: Sep. 18, 1995

[51] Int. Cl.$^6$ .......................... A46B 11/02; A46B 11/06
[52] U.S. Cl. .................. 401/44; 401/46; 401/47; 401/283; 401/287
[58] Field of Search ...................... 401/44, 45, 46, 401/47, 283, 287

[56] References Cited

U.S. PATENT DOCUMENTS

| | | | |
|---|---|---|---|
| 2,960,710 | 11/1960 | McKeegan | 401/46 |
| 2,965,305 | 9/1960 | Glazer et al. | |
| 3,142,084 | 7/1964 | McMullen | 401/46 |
| 3,178,756 | 4/1965 | Ballantyne | 401/47 |
| 3,751,755 | 8/1973 | Smith | 401/46 X |
| 4,006,703 | 2/1977 | Smith | 118/312 X |
| 4,057,353 | 11/1977 | Kitatani | 401/46 X |
| 4,383,935 | 5/1983 | Hull | 401/46 X |
| 5,575,852 | 11/1996 | Chase | 118/680 |

FOREIGN PATENT DOCUMENTS

| | | | |
|---|---|---|---|
| 1299558 | 6/1962 | France | 401/46 |
| 1904942 | 8/1970 | Germany | 401/46 |
| 2410844 | 9/1974 | Germany | 401/47 |

*Primary Examiner*—Steven A. Bratlie
*Attorney, Agent, or Firm*—R. William Graham

[57] ABSTRACT

The present invention is directed to a hand held brush for delivering multiple foamable wash/wax solutions and designed to effectively and aesthetically wax the vehicle which includes a generally hollow elongated shaft having a first end and a second end and a plurality of veins extending thought the shaft, a head connected to the first end of the shaft and having a plurality separate compartments and a plurality of aperture surfaces formed within the head, a first of the compartments communicating with a first of the veins and a first of the aperture surfaces, and a second of the compartments communicating with a second of the veins and a second of the aperture surfaces, and the head further having means connected to the head for aiding application of the foamable wash/wax solutions.

16 Claims, 3 Drawing Sheets

HAND HELD BRUSH FOR DELIVERING MULTIPLE FOAMABLE WASH/WAX SOLUTIONS

BACKGROUND OF THE INVENTION

1. Field of the Invention

The present invention relates generally to vehicle wash systems and more particularly, but not by way of limitation, to hand held brushes which deliver multiple foamable wash/wax solutions and designed to effectively and aesthetically wash/wax the vehicle.

2. Background of the Invention

Conventional types of hand held vehicle wash and wax systems adapted to clean and protect a vehicle provide for a hand operated high pressure wand which sprays the vehicle. Such hand held type permits the user to optionally select one of a wash, rinse or wax modes. Still, others employ separate wands or brushes to deliver one of a wash or wax solutions.

With present wash/wax wands and brushes there lacks for a more suitable and aesthetically pleasing means for providing an adequate delivery of the wash/wax solutions to the car. Particularly, a hand held brush having an ability to deliver multiple foamable wash/wax solutions is needed.

SUMMARY OF THE INVENTION

It is a general object is to improve hand held brushes for delivering foamable wash/wax solutions to a vehicle.

Another object of the present invention is to further add special visual effects to a car washing event through an improved hand held brush for delivering foamable wash/wax solutions.

Accordingly, the present invention is directed to a hand held brush particularly well suited for delivering foamable wash/wax solutions to a vehicle. In an embodiment, the hand held brush includes a generally hollow elongated shaft having a first end and a second end and a plurality of veins extending through the shaft, a head connected to the first end of the shaft and having a plurality separate compartments and a plurality of aperture surfaces formed within the head, a first of the compartments communicating with a first of the veins and a first of the aperture surfaces, and a second of the compartments communicating with a second of the veins and a second of the aperture surfaces. The head further has means connected to the head for aiding application of the foamable wash/wax solutions.

The hand held brush further includes a third of the compartments communicating with a third of the veins and a third of the aperture surfaces.

In another embodiment, the hand held brush includes a fourth of the veins having means for communicating with each of the first, second and third veins adjacent the head. Each of the veins is operably connected to separate foamable wash/wax solutions via a foam generator, wherein each of the foamable wash/wax solutions differs in a color component. This permits for an aesthetically pleasing visual effect to the viewer, i.e., a rainbow effect appears onto the vehicle, as well as permitting an easier visual inspection of the solution coverage and adherence to the vehicle.

Other aspects, features and details of the present invention can be more completely understood by reference to the following detailed description of some preferred embodiments, taken in conjunction with the drawings and from the appended claims.

DETAILED DESCRIPTION OF THE PREFERRED EMBODIMENTS

Figure 1:
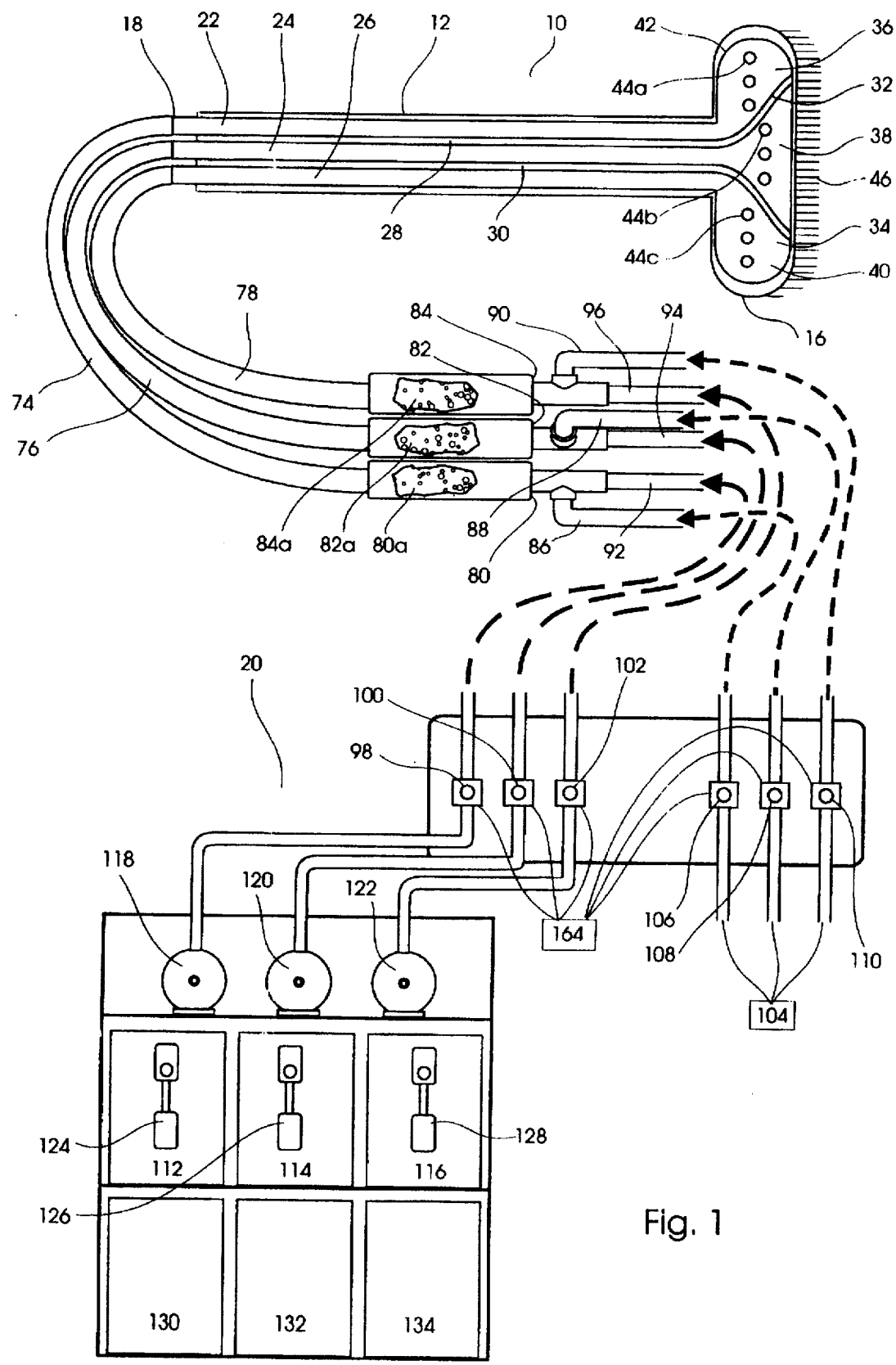
FIG. 1 is a schematic view of a hand held brush operably connected to foam generators and foamable wash/wax solution sources.

Referring to the drawings, a hand held brush for delivering foamable wash/wax solutions is generally designated by the numeral 10. The brush 10 has a generally hollow elongated shaft 12 which is integrally connected at one end to an enlarged hollow head 16 and at another end 18 to a foamable wash/wax solution supply source generally designated by the numeral 20.

As seen in FIG. 1, the shaft 12 is formed in a manner to have three separate veins 22, 24 and 26. The veins 22, 24 and 26 can take numerous forms, such as those shown in FIGS. 2 and 3. Additionally, the number of foamable wash/wax solutions and veins can vary to create a desired effect.

Figure 2:
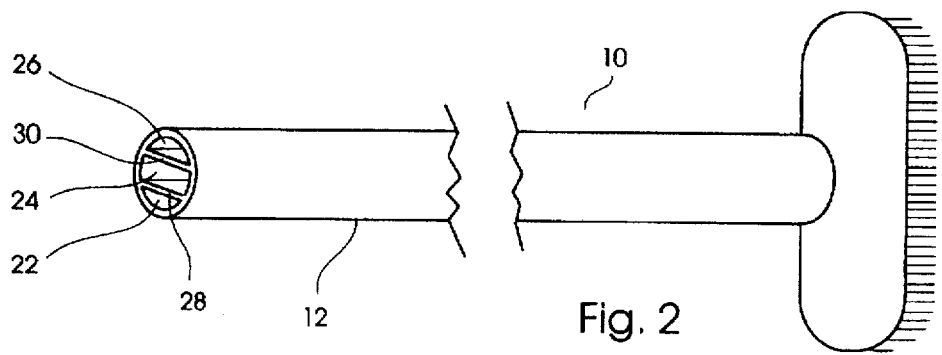
FIG. 2 is a perspective of one embodiment of the hand held brush of the present invention.

For FIG. 2, the walls 28 and 30 separate the veins 22, 24 and 26. The head 16 is subdivided by internal walls 32 and 34, as shown in FIG. 1, and integrally join with the walls 28 and 30, respectively. Three separate compartments 36, 38 and 40 are formed within the head 16. Along one surface 42 of the head 16 and within each compartment 36, 38 and 40 are formed a plurality of aperture surfaces 44a, 44b and 44c. The vein 22, compartment 36 and aperture surfaces 44a are in communication with one another. Similarly, vein 24, compartment 38 and aperture surfaces 44b are in communication with one another and vein 26, compartment 40 and aperture surfaces 44c are in communication with one another. Along the surface 42, connected are a plurality of bristles 46 to aid application of foamable wash/wax solutions.

Figure 3:
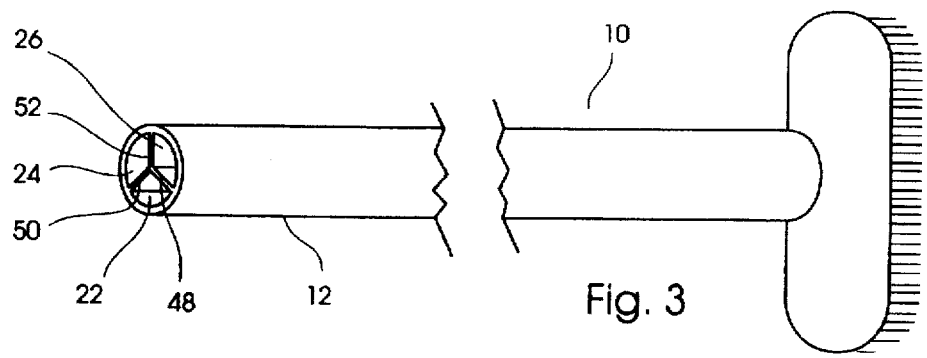
FIG. 3 is a perspective of another embodiment of the hand held brush of the present invention.

Alternatively, the brush 10 disclosed in FIG. 3 is formed with three walls 48, 50 and 52 separating the veins 22, 24 and 26. The walls 48, 50 and 52 join with internal walls formed in the head to likewise form three compartments.

Figure 4:
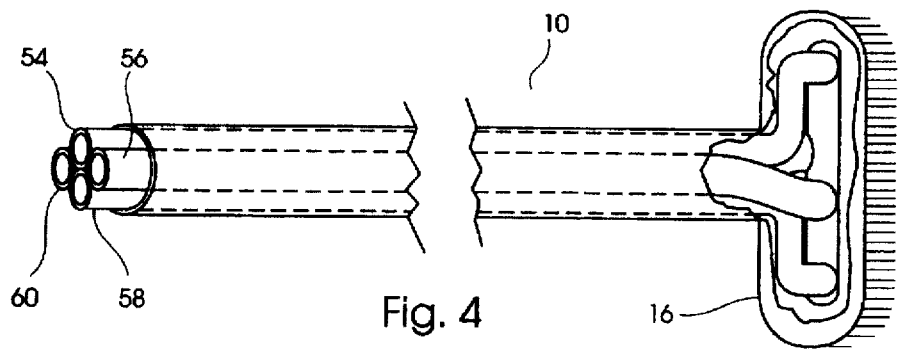
FIG. 4 is a cross sectional of another embodiment of the hand held brush of the present invention.
Figure 5:
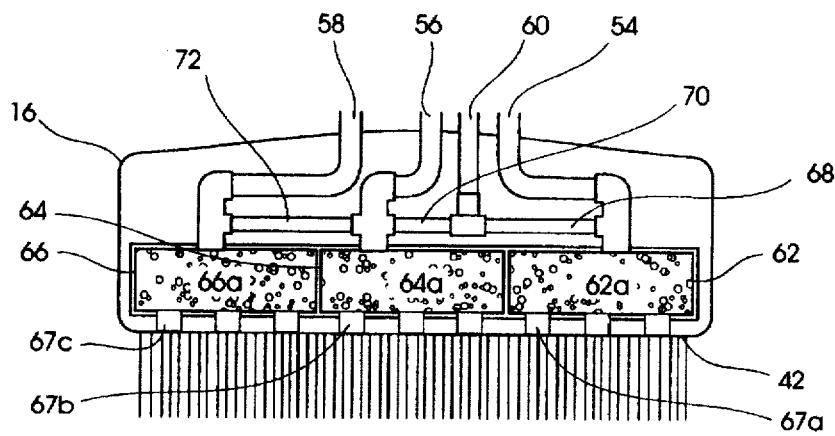
FIG. 5 is a cross sectional of a head of the hand held brush of an embodiment of the present invention.
Figure 6:
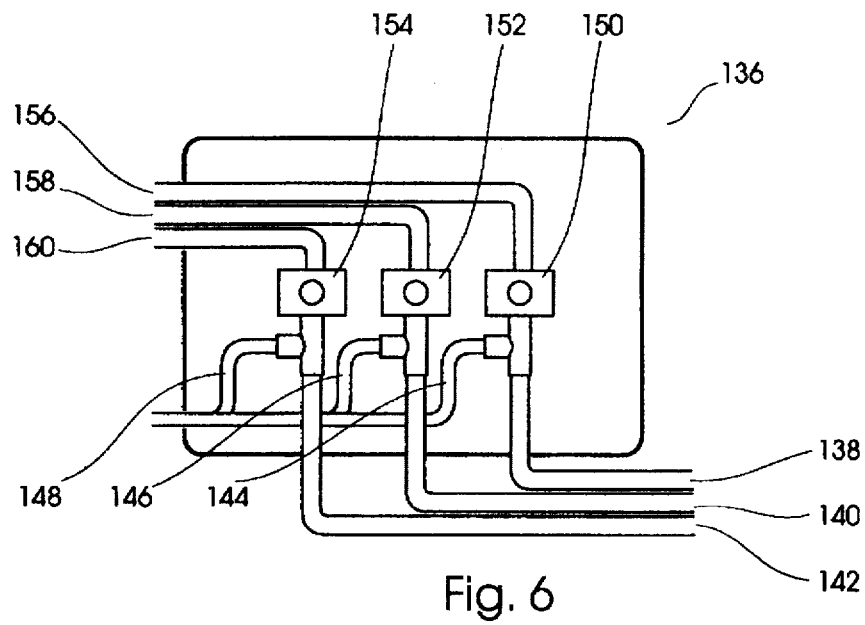
FIG. 6 is a side view of the manifold of the present invention.

In the embodiment as seen in FIG. 4, the brush 10 includes a plurality of lines or veins 54, 56, 58 and 60 through which desired foamable wash/wax solutions and air may be transferred to create a foamable solution at the head 16. In this embodiment, the head 16 shown in FIG. 5 includes three compartments 62, 64 and 66 each having a porous or spongy material 62a, 64a and 66a, respectively, each in communication with lines 54, 56 and 58, respectively, and having open surfaces 67a, 67b and 67c, formed in the surface 42 of the head 16. The hose 60 in this embodiment communicates with lines 54, 56 and 58 via lines 68, 70 and 72. Here, the line 60 would act as a conduit through which air passes to each of the hoses 54, 56 and 58 which receive the foamable wash/wax solutions from the supply source 20 to create a foam upon exiting the material 62a, 64a and 66a.

As shown in FIG. 1, each of the veins 22, 24 and 26 are connected to fluid transport lines 74, 76 and 78 which in turn are connected to foam generators 80, 82 and 84 having a porous or spongy material 80a, 82a and 84a, respectively, and can be of a type known in the art. Each of the foam generators 80, 82 and 84 include air intake lines 86, 88 and 90, respectively, and wash/wax solution intake lines 92, 94 and 96, respectively. The air intake lines 86, 88 and 90 are operatively connected to solenoids 106, 108 and 110, respectively, each of which is connected to a pressurized air source 104. The wash/wax solution intake lines 92, 94 and 96 are operatively connected to solenoids 98, 100 and 102, respectively, which are operatively connected fluid module tanks 112, 114 and 116. Air pumps 118, 120 and 122 interconnect the fluid module tanks 112, 114 and 116 to the solenoids 98, 100 and 102. Additionally, hydro valves 124, 126 and 128 are operatively disposed on the fluid module tanks 112, 114 and 116, respectively, and receive wash and or wax chemical from tanks 130, 132 and 134. Water and wash and or wax chemical solutions are mixed into the fluid module tanks 112,114 and 116 by the hydro valves 124, 126 and 128, respectively, via a venturi effect from the air pumps 118, 120 and 124 to create the foamable wash/wax solutions. The mixed solutions are pumped through solenoids 98, 100 and 102 and into the foam generators 80, 82 and 84. Differing color additives, for example blue, yellow and red colorants are added to each of the fluid modules tanks 112, 114 and 116, respectively, to create a rainbow effect upon exiting the head 16 of the brush 10 and aid in applying the wash/wax solutions to the entire surface of the car surface.

It should be noted that the foam generators including the porous material can be disposed within the veins of the shaft. In such case, the manifold 136 can be employed with fluid intake lines 138, 140 and 142 connected with air intake lines 144, 146 and 148, respectively, which connect to solenoids 150, 152 and 154, respectively. Lines 156, 158 and 160 connect solenoids 150, 152 and 154, respectively, and transport mixed wash/wax solution into the veins 22, 24 and 26 wherein the solutions will pass through the porous material to create a foam.

Figure 7:
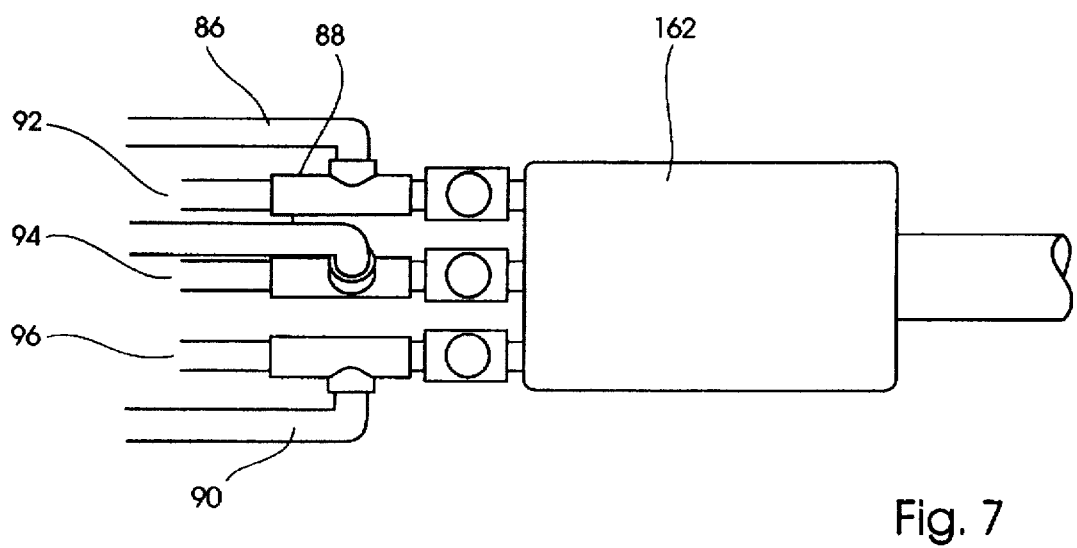
FIG. 7 is a side view of another foam generator of the present invention.

Alternatively as shown in FIG. 7, a single foam generator 162 can be used in lieu of the three foam generators 80, 82 and 84. In this situation, there need not be any veins in the shaft 12 as the foam generator 162 is used in conjunction with a control mechanism 164 operatively connected to solenoids 98, 100, 102, 106, 108 and 110. The control mechanism 164 is used, for example, to sequentially or concurrently pump the wash/wax solutions using the pressured air source 104 at predetermined intervals to provide a chemical and/or colorant variation upon exiting from the head 16. The control mechanism 164 can be set to cause an overlap in the delivery of wash/wax solutions into the foam generator 162 creating a chemical and/or colorant blend to provide an additional unique effect.

The present invention has been described with a certain degree of particularly but is not intended to be limiting with respect to the claims hereto. In this regard, it is understood that the present disclosure has been made by way of example and changes in detail or structure may be made without departing from the spirit of the invention and the full scope of protection should be accorded the appended claims hereto.

What is claimed is:

1. A hand held brush for delivering multiple foamable wash/wax solutions and designed to effectively and aesthetically wash/wax a vehicle, comprising:

a generally hollow elongated shaft having a first end and a second end and a plurality of veins extending through said shaft;

a scrubbing head connected to said first end of said shaft and having a plurality of separate compartments and a plurality of aperture surfaces formed within the head, a first of said compartments communicating with a first of said veins and a first of said aperture surfaces, and a second of said compartments communicating with a second of said veins and a second of said aperture surfaces; and wherein said first vein is operably connected to a first foamable wash/wax solution having a first color component, and said second vein is operably connected to a second foamable wash/wax solution having a second color component.

2. The hand held brush of claim 1, wherein said head further has means connected to said head for aiding application of the foam wash/wax solutions.

3. The hand held brush of claim 2, wherein said aiding application means includes a plurality of bristles.

4. The hand held brush of claim 1, which further includes a third of said compartments communicating with a third of said veins and a third of said aperture surfaces.

5. The hand held brush of claim 1, which further includes a third of said veins having means for communicating with each of said first vein and said second vein adjacent said head.

6. The hand held brush of claim 4, wherein said first vein is operably connected to a first foamable wash/wax solution, and said second vein is operably connected to a second foamable wash/wax solution of a different composition than said first foamable wash/wax solution, and said third vein is operably connected to a third foamable wash/wax solution of a different composition than said first foamable wash/wax solution and said second foamable wash/wax solution.

7. The hand held brush of claim 6, wherein said first foamable wash/wax solution, said second foamable wash/wax solution and said third foamable wash/wax solution differ in a color component from one another.

8. The hand held brush of claim 4, wherein said first vein is operably connected to a first foamable wash/wax solution, and said second vein is operably connected to a second foamable wash/wax solution of a different composition than said first wash/wax solution and said third vein is operably connected to a third foamable wash/wax solution of a different composition than said first and second foamable solutions, and which further includes a first foam generator operably disposed between said first foamable wash/wax solution and said first vein, a second foam generator operably disposed between said second foamable wash/wax solution and said second vein and a third foam generator operably disposed between said third foamable wash/wax solution and said third vein.

9. The hand held brush of claim 4, wherein said first vein is operably connected to a first foamable wash/wax solution, and said second vein is operably connected to a second foamable wash/wax solution of a different composition than said first wash/wax solution and said third vein is operably connected to a third foamable wash/wax solution of a different composition than said first and second foamable wash/wax solutions, and which further includes a first foam generator operably dispose within said first vein, a second foam generator operably disposed within said second vein and a third foam generator operably disposed within said third vein.

10. The hand held brush of claim 1, which further includes a first foam generator operably disposed between said first foamable wash/wax solution and said first vein and a second foam generator operably disposed between said second foamable wash/wax solution and said second vein.

11. The hand held brush of claim 1, which further includes a first foam generator operably disposed within said first vein and a second foam generator operably disposed within said second vein.

12. The hand held brush of claim 1, wherein each said compartment includes a first foam generator operably disposed therein.

13. A hand held brush for delivering multiple foam wash/wax solutions and designed to effectively and aesthetically wash/wax a vehicle, comprising:
- a generally hollow elongated shaft having a first end and a second end, said shaft having a vein defined therein;
- a scrubbing head connected to said first end of said shaft and having an aperture in communication with said vein;
- a first foamable wash/wax solution having a first color component communicating with said vein;
- a second foamable wash/wax solution having a second color component communicating with said vein and of a different composition than said first foamable wash/wax solution;
- a foam generator operatively and communicatively disposed between said foamable was/wax solutions and said vein; and
- means for controlling delivery of each said foamable wash/wax solutions.

14. The hand held brush of claim 13, wherein said controlling delivery means is capable of one of sequential and concurrent delivery of said foamable wash/wax solutions.

15. A hand held brush for delivering multiple foam wash/wax solutions and designed to effectively and aesthetically wash/wax a vehicle, comprising:
- a generally hollow elongated shaft having a first end and a second end, said shaft having a vein defined therein;
- a scrubbing head connected to said first end of said shaft and having an aperture in communication with said vein;
- a first foamable wash/wax solution having a first color component communicating with said vein;
- a second foamable wash/wax solution having a second color component communicating with said vein and of a different composition than said first foamable wash/wax solution;
- a foam generator operatively and communicatively disposed within said vein; and means for controlling delivery of each said foamable wash/wax solutions.

16. The hand held brush of claim 15, wherein said controlling delivery means is capable of one of sequential and concurrent delivery of said foamable wash/wax solutions.

* * * * *